United States Patent [19]

Lain et al.

[11] 3,918,000

[45] Nov. 4, 1975

[54] ANNUNCIATOR SYSTEM COMMUNICATING VIA A MINIMUM AVAILABLE COMMUNICATION CHANNEL

[75] Inventors: Victor Y. Lain, Santa Clara; Werner Yee, San Mateo, both of Calif.

[73] Assignee: Signacom Systems, Inc., Redwood City, Calif.

[22] Filed: Aug. 16, 1973

[21] Appl. No.: 388,895

[52] U.S. Cl. ........................ 325/64; 325/8; 325/55; 340/147 R; 340/167 R; 340/311

[51] Int. Cl.² ........................................... H04B 1/00

[58] Field of Search ........... 325/6, 8, 16, 22, 23, 32, 325/55, 64; 340/15 R, 167 R, 171 R, 147 R, 147 A, 181, 310–312

[56] References Cited

UNITED STATES PATENTS

| | | | |
|---|---|---|---|
| 2,812,509 | 11/1957 | Phelps | 325/55 |
| 3,174,100 | 3/1965 | Orr, Jr. | 325/64 |
| 3,510,777 | 5/1970 | Gordon | 325/55 |
| 3,657,715 | 4/1972 | Curtin | 340/311 |
| 3,665,313 | 5/1972 | Trent | 325/64 |

*Primary Examiner*—Robert L. Griffin
*Assistant Examiner*—Jin F. Ng
*Attorney, Agent, or Firm*—Flehr, Hohbach, Test Albritton & Herbert

[57] ABSTRACT

A multi-station annunciator system communicating via a minimum, available communications channel. Transmitter and receiver units utilize signal processors to minimize dependence upon an available communications medium and a minimum communications channel. A system is disclosed which reliably propagates messages over minimum electromagnetic communications channels such as available power line wiring.

1 Claim, 2 Drawing Figures

ANNUNCIATOR SYSTEM COMMUNICATING VIA A MINIMUM AVAILABLE COMMUNICATION CHANNEL

BACKGROUND OF THE INVENTION

This invention relates generally to an annunciator communication system including transmitter and receiver units communicating over a minimum, available communications channel and more particularly the utilization of signal processing within transmitter and receiver units to increase communications reliability in the presence of noise and other signal degradation contributed by a minimum available communications channel.

A minimum, available communications channel may be defined as a channel which is the minimum tolerable link between communicating annunciators, such that the annunciators are substantially reliable in their ability to communicate. A minimum available channel would be obtaining such a minimum channel within available communications mediums such as available power line wiring or available building ducting or structure.

Annunciator communication systems are well known in hospitals, medical, dental, and general business offices. Prior art systems have not been especially satisfactory because of difficulties in system installation, initial system expense, reliability and system expansion. For example, one present system requires a large thirty conductor interconnecting cable installed permanently between annunciator units. Key drawbacks are the fixed cable routing and installation required, the initial labor expense of system installation, and the poor reliability inherent in the multiple interconnections between units, any one of which can develop faults and render the entire system inoperative. Once a fixed, hard-wired system is installed, system expansion is strictly limited by the cable capacity. Increasing system capacity requires the installation of a new cable and system. Communication over available channels, such as power line wiring, is evident in the wireless voice intercom systems known in the art. However present wireless systems are highly dependent on power line integrity, lack any degree of security, and are noisy in operation. Further, present systems have little noise immunity and thus have excessive error rates and poor communications reliability.

OBJECTS AND SUMMARY OF THE INVENTION

It is a general object of the present invention to provide an improved annunciator communications system using digital signal processors to minimize system dependence upon the communications medium.

It is another object of the present invention to provide a high reliability, noise immune annunciator system which is easily installed, readily expanded.

It is another object of the present invention to provide a method of reliable relatively secure annunciator system communication via minimum, available communication channels.

The foregoing and other objects of the invention are achieved by a minimum communications channel annunciator system including a first digital signal processor having message input means, means coupling the output of the first signal processor to a communications channel, a communications channel over which the message is propagated, means coupling the input of a second signal processor to the communications channel and a second digital signal processor having message output indicator means responsive to the message input means.

DESCRIPTION OF PREFERRED EMBODIMENT

Figure 1A:
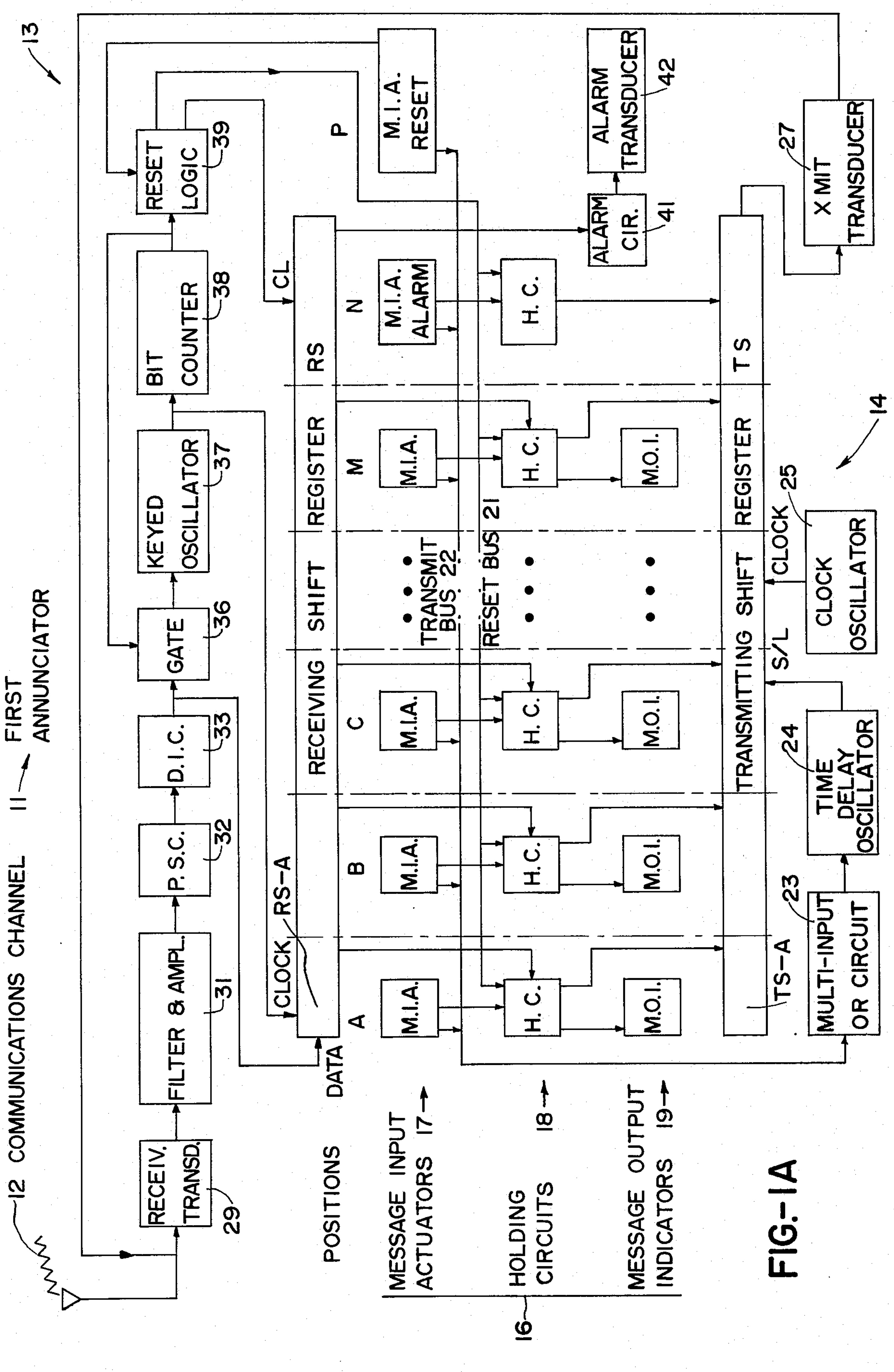
FIGS. 1A and B show a block diagram of an annunciator system operable over a communications channel in accordance with invention.
Figure 1B:
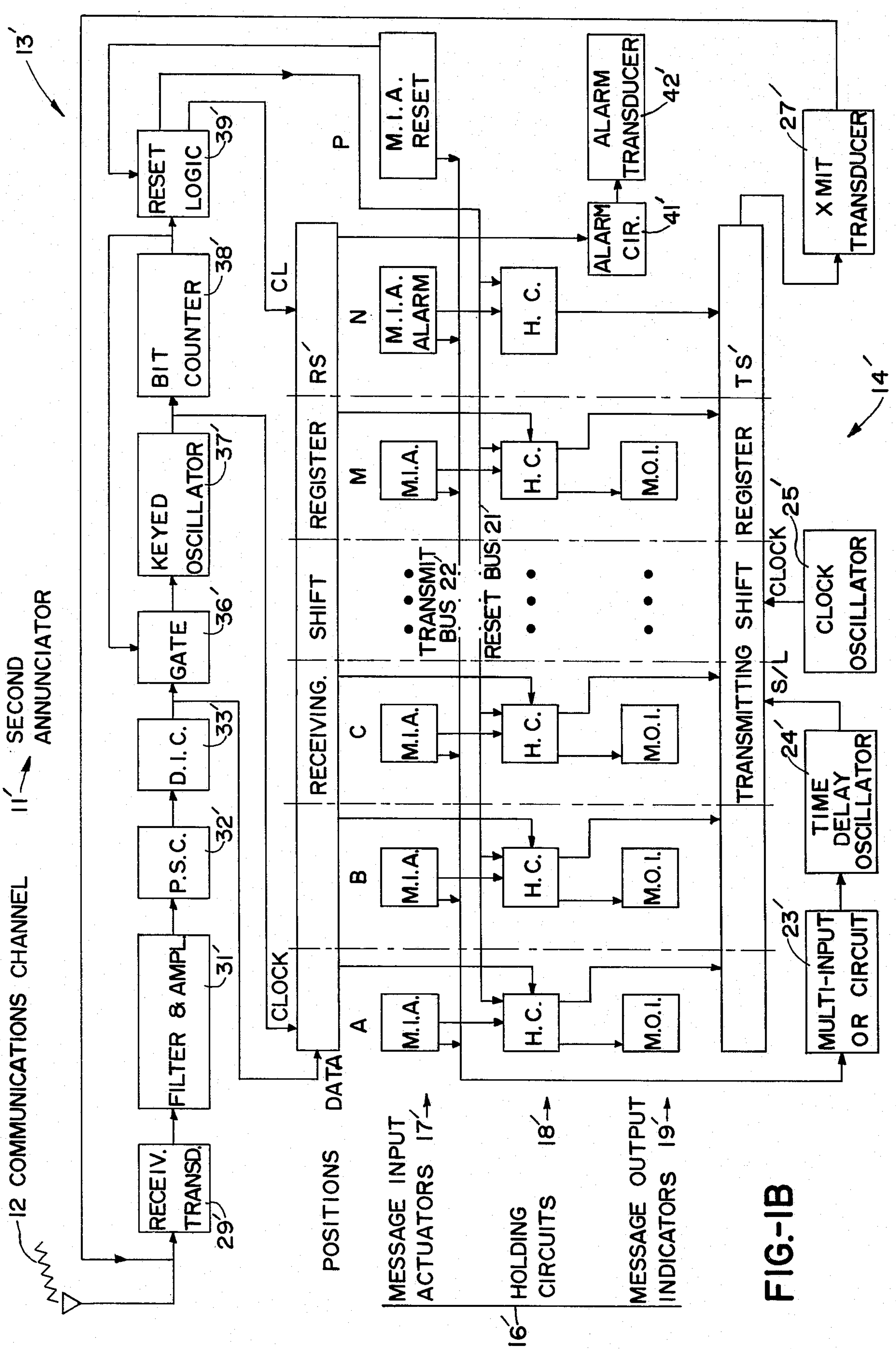

Referring to FIGS. 1A and 1B an overall communication system is shown including a first annunciator 11, FIG. 1A, additional annunciator 11', FIG. 1B and a communications medium capable of supporting a relatively low signal-to-noise ratio communications data channel 12, intercoupling the annunciators. The system is capable of utilizing a variety of communications media which support wave propagation, such as electromagnetic, acoustical, and magnetic wave media. Electromagnetic propagation at approximately 100 kilohertz over available power line wiring is used in the present embodiment.

Although first annunciator 11 and additional annunciator 11' are required for normal bi-directional communication, the annunciators are identical. Thus only the first annunciator 11 will be described, it being understood that the additional annunciator 11' is identical although located at the opposite end of the communications channel 12 confronting annunciator 11.

Referring to FIG. 1A, a block diagram of annunciator 11 is shown including a receiver 13, a transmitter 14 and a control panel 16 interconnecting the receiver and transmitter. Control panel 16 includes multiple message positions comprising transit-receive positions A through M, alarm position N and reset position P. Transit-receive message positions, such as position A, include a message input actuator 17, a holding circuit 18, a message output indicator 19, a receiver message storage location RS-A and a transmitter message storage location TS-A. As will be presently shown, receiver 13 and transmitter 14 include storage, such as shift register locations, having one location for each message position in the transmitter, (e.g. TS-A, B . . . N) and receiver, (e.g. RS-A, B . . . N) respectively.

In each position a message input actuator 17, such as a manually operated switch, has two outputs. In position A, by example, a first output is connected to one latch input of holding circuit 18A. Holding circuit 18A has a second latch input from parallel read shift register location RS-A of receiver 13, and a reset input from common reset bus 21. A first output from holding circuit 18A is connected to a message output indicator 19A and a second output to parallel load shift register location TS-A of transmitter 14.

A second output of message input actuator 17 is connected to transmit but 22 which is common to all positions. Transmit bus 22 connects all positions to multi-input OR circuit 23. The output of OR circuit 23 is connected to the input of time delay oscillator 24 which has an output connected to the SHIFT/LOAD (S/L) input of the transmitter shift register TS. Clock oscillator 25 is connected to the clock input of shift register TS. The output of shift register TS is connected to the input of transmit transducer 27. Transducer 27 converts the output of TS into a form acceptable to channel 12, for example transducer 27 may be an electromagnetic transmitter amplitude modulated by the output of TS. The output of transmit transducer 27 is coupled to the communications channel 12 and to the input of receiver 13.

Referring specifically to the receiver portion of the annunciator, receiver 13 includes a receiver transducer 29 coupled to the communications channel 12. The output of transducer 29 is connected to the input of filter and amplifier 31 having an output connected to pulse shaping circuit 32. The output of pulse shaping circuit 32 is connected to data interrogation circuit 33 which has two outputs one connected to the data input of receiver shift register RS, and the second output connected to gate 36. Gate 36 has a second input as will be presently seen. The output of gate 36 is connected to keyed oscillator 37 which has two outputs, one connected to the clock input of receiver shift register RS and the second output connected to bit counter 38. The output of bit counter 38 provides the second input to gate 36 and also provides an input to reset logic 39. The position P reset actuator provides a second input to reset logic 39 which has two outputs, the first connected to the CLEAR (CL) input to shift register RS and the second driving reset bus 21. Receiver shift register RS provides a storage location for each message position and further provides parallel read-out lines which connect to the second latch input of the holding circuit 18 in each position. A further output of register RS connects to alarm circuit 41 which activates alarm transducer 42.

Turning now to system operation, a user actuates a message input actuator or actuators 17 corresponding to the a priori message he wishes to send. A single message position may correspond to a complete message. Or positions may be combined as component parts of a complete message. For example, positions A-F may represent specific personnel and positions G-M commands, one of which is the command COME. In transmitting a message the user actuates his personnel actuator (e.g. A), the actuator of the person he wishes to communicate with (e.g. F) and the command actuator COME. Accordingly the message "F come to A" is transmitted by transmitter 14, received and displayed by receiver 13 and receiver 13' of annunciator 11'. Upon viewing the message, addressee "F" may acknowledge by actuating reset actuator P on annunciator 11', whereby actuator 11' transmits a reset signal to annunciator 11 which is received by receiver 13 and resets the indicators 19 and all positions. When the message indicators 19 are extinguished, "A" is given acknowledgment that his message is received.

If acknowledgment is not forthcoming, "A" may further actuate alarm position actuator N which activates alarm transducer 42 and 42' alterting all personnel that a message has been sent and must be acknowledged.

More particularly, when actuator 17A is activated a first signal output drives and latches holding circuit 18A. The output of holding circuit 18A activates 19A and parallel loads position A of shift register TS. A second signal output from actuator 17A provides a transmit signal to multi-imput OR circuit 23 via transmit bus 22. The output signal from OR circuit 23 provides a start signal to time delay oscillator 24. Time delay oscillator 24 drives the S/L input to register TS, and cycles from SHIFT to LOAD within the relatively short time delay provided. Time delay oscillator 24 may be a conventional triggered mono-stable oscillator.

During the LOAD period, the TS multiple shift register storage locations are charged by load lines from the holding circuits of each message positions A-N. At the end of the load period time delay oscillator 24 sends a SHIFT signal to shift register TS. Clock oscillator 25 then clocks the register TS serial shift output to transmit transducer 27 having an output coupled to communications channel 12 and receiver 13. Clock oscillator 25 may be a conventional circuit having a one millisecond repetition rate. Further, the serial output of register TS may amplitude modulate a 100 kilohertz transmitter which is coupled to communications channel 12. The transmitted signal from transducer 27 is coupled to the inputs of receiver 13 and via communications channel 12 to the input of receiver 13'. As previously discussed receivers 13 and 13' are identical, therefore only the operation of receiver 13' will be described. It must be noted however, that receiver 13 during system operation provides a useful monitor of the transmitted signal from transmitter 14. Although indicators 19 are latched in the transmit function, they are reset prior to the read out of receiver 13 register RS. Therefore, after receiver 13 resets the indicators 19, only the received signal is displayed. Any discrepancy in the message displayed between transmit and simultaneous receive operation indicates a fault within the annunciator unit 11 which can then be removed from service without disturbing other annunciator units.

Referring specifically to receiver 13', the signal input to this receiver may be degraded from the signal input to receiver 13 because the signal to receiver 13' must pass through communications channel 12 which contributes noise, varying signal strength and signal degradation inherent in a general communications channel. The signal input to receiver 13' is by way of receiver transducer 29' which provides an output to filter and amplifier 31'. Conventional input filter and amplifing circuitry is used, such as an input transducer, a bandpass filter, and an amplifier tuned to approximately 100 kilohertz. The output signal from filter and amplifier 31' provides an input signal to pulse shaping circuit 32'. Circuitry of pulse shaping circuit 32' shapes the output of filter and amplifier 31' and provides an amplitude limited output signal to data interrogation circuit 35'. Data interrogation circuit 33' senses pulse width and discriminates desired digital signal pulses from insufficient length pulses such as noise. Pulse shaping circuitry 32' and data interrogation circuitry 35' may be conventional circuits the former may be amplitude-sensitive transistor switches and the latter a conventional integrator. The output from data interrogation circuit 33' provides a data input to receiving shift register RS' and also provides an input to gate 36'. Gate 36' normally provides an input to keyed oscillator 37'. Keyed oscillator 37' is triggered in response to the digital signal from data interrogation circuit 33' and produces a replica of the input signal at its output which provides a clock signal to receiving shift register RS'. Keyed oscillator 37' also provides an input to bit counter 38' which counts the replica of the incoming signal and when sufficient signal has filled receiving shift register RS', bit counter 38' provides an output signal which opens gate 36' thereby discontinuing the serial flow data into receiving shift register RS'. Further, the last count output of bit counter 38' provides an input to reset logic 39' which responds by momentarily providing a reset output a reset bus 21'. This momentary reset output is provided so that the holding circuits 18' in each position A-M are reset prior to the read out of the newly stored data in receiving shift register RS'. Once reset, holding circuits 18' respond to the real-time read out data lines from receiving shift regiter RS' in each position A-M. Thus the transmitted message from the first annunciator 11 is now indicated on the control panel 16' of second annunciator 11'.

A second input to reset logic 39' is provided by message position P. In this reset mode, reset logic 39' has an output which provides a CLEAR (CL) to receiving register RS and a second output clears holding circuits 18' in all positions. A second output from message position P provides a signal to the multi-input OR 23' via transmit bus 22' and thus initiates a return acknowledgment signal from annunciator 11' to annunciator 11. Receiving shift register RS' also provides an output to alarm circuit 41' which has an output to alarm transducer 42'. As previously discussed, actuation of annunciator 11 position N actuator transmits a signal which when received by annunciator 11' activates N position alarm circuit 41' and alarm transducer 42'.

It is apparent from the foregoing that an annunciator system has been provided which uses digital signal processors to minimize system dependence upon a communications medium. A system may utilize available power line wiring, common cable ducts, or metal structural members to interconnect individual annunciators into a highly reliable, noise immune system. For example, a system may be easily installed and readily expanded by plugging multiple units into the common power line. Further each unit may be individually unplugged for repair without disrupting system operation. Finally, the digital processors provide a degree of privacy and security from unwanted message interception.

We claim:

1. In a minimum communications channel annunciator of the type utilizing transmit and receiver transducers the system comprising, a first digital signal processor including a shift register having plural bit storage locations and an output for serially shifting a corresponding single message defined by a predetermined number of serial bits, plural manually operated load switch inputs connected to said register for parallel loading said locations, a time delay oscillator including a triggered mono-stable oscillator responsive to said load inputs for causing said register after a predetermined time delay to serial shift said stored message output to modulate the transmit transducer to the communications channel, a transmit transducer modulated by said first transducer and coupled to the communications channel, a receiver transducer coupling the input of a second signal processor to the communications channel, and a second digital signal processor including a second shift register serially responsive to the serial shift of said first register to receive said serial bits, including a bit counter for counting said predetermined number of bits, and including a gate responsive to said bit counter for discontinuing said bits to said second shift register and said register having parallel read out and having plural message output indicators responsive to each of said respective manual switch inputs.

* * * * *